United States Patent [19]
Buck et al.

[11] Patent Number: 4,990,846
[45] Date of Patent: Feb. 5, 1991

[54] TEMPERATURE COMPENSATED VOLTAGE REFERENCE CIRCUIT

[75] Inventors: Paul E. Buck, Russiaville; Robert J. Campbell, Noblesville; Debra E. Poppas, Kokomo; John R. Shreve, Kokomo; Richard J. Voss, Kokomo, all of Ind.

[73] Assignee: Delco Electronics Corporation, Kokomo, Ind.

[21] Appl. No.: 498,511

[22] Filed: Mar. 26, 1990

[51] Int. Cl.$^5$ .............................................. G05F 3/22
[52] U.S. Cl. .................................. 323/314; 323/907; 307/310; 322/28
[58] Field of Search ............... 323/313, 314, 315, 316, 323/907; 322/23, 28; 307/310

[56] References Cited

U.S. PATENT DOCUMENTS

| | | | |
|---|---|---|---|
| 3,496,447 | 2/1970 | Thompson | 322/23 |
| 3,535,616 | 10/1970 | Rutherford et al. | 322/28 |
| 3,585,482 | 6/1971 | Zellna | 320/39 |
| 4,220,908 | 9/1980 | Nicol | 322/28 |
| 4,352,053 | 9/1982 | Oguchi et al. | 323/907 |
| 4,396,883 | 8/1983 | Holloway et al. | 323/313 |
| 4,470,003 | 9/1984 | Mitchell | 322/28 |
| 4,490,670 | 12/1984 | Wong | 323/907 |
| 4,507,572 | 3/1985 | Hashimoto et al. | 323/314 |
| 4,563,631 | 1/1986 | Mashino et al. | 322/28 |
| 4,629,967 | 12/1986 | Voss | 322/28 |
| 4,658,205 | 4/1987 | Yamada | 323/907 |
| 4,680,530 | 7/1987 | Mashino | 322/28 |
| 4,727,307 | 2/1988 | Kaneyuki et al. | 322/22 |
| 4,797,577 | 1/1989 | Hing | 323/907 |
| 4,893,032 | 1/1990 | Braden | 323/907 |

*Primary Examiner*—Peter S. Wong
*Attorney, Agent, or Firm*—C. R. Meland

[57] ABSTRACT

A reference voltage developing circuit that develops a multiple slope reference voltage that is a function of temperature. The circuit has a plurality of base-emitter multipliers each of which includes a transistor and each of which develops an output voltage that is a function of the base-emitter voltage of the transistor of the multiplier. Since the base-emitter voltage varies with changes in temperature, each multiplier circuit develops a voltage that varies with changes in temperature. The multiplier circuits have different multiplier magnitudes to thereby provide temperature dependent output voltages that have different slopes. A voltage selector circuit is connected to the multiplier circuits and it provides an output voltage that corresponds to the higher of the output voltages developed by the multiplier circuits.

7 Claims, 1 Drawing Sheet

TEMPERATURE COMPENSATED VOLTAGE REFERENCE CIRCUIT

This invention relates to a temperature compensated voltage reference circuit which develops a multiple slope reference voltage that is a function of temperature.

Voltage reference circuits for generator voltage regulators that develop a reference voltage that varies with changes in temperature are well known, one example being the circuit disclosed in the U.S. Pat. No. to Voss, 4,629,967. In that patent, a base-emitter multiplier comprised of circuit elements 106, 112 and 118 is used to produce a voltage that varies with the changes in temperature. A disadvantage of this circuit is that transistor 106 is operated in a saturated condition at hot temperatures. When a transistor operates in saturation, there are errors associated with such operation which results in a loss of accuracy.

The voltage reference circuit of this invention, like the system shown in the above-referenced Voss patent, uses base-emitter multipliers but unlike the Voss system, the transistors of the multipliers are never allowed to be biased into saturation, thereby eliminating errors associated with operation in saturation. It, accordingly, is one of the objects of this invention to provide a temperature compensated voltage reference circuit that utilizes base-emitter multipliers where the transistor of a base-emitter multiplier is never biased into saturation.

Another object of this invention is to provide a multiple slope voltage reference circuit that provides a temperature related output voltage that has different multiple slopes. This object is accomplished by providing a plurality of base-emitter multipliers each of which develops an output voltage that varies with temperature and wherein the respective output voltages of the multipliers have different slopes. The multipliers are connected to a voltage selector network which selects the output voltage of only one of the multipliers. In a preferred arrangement, the voltage selector circuit selects the higher of the output voltages of the multipliers.

Figure 1:
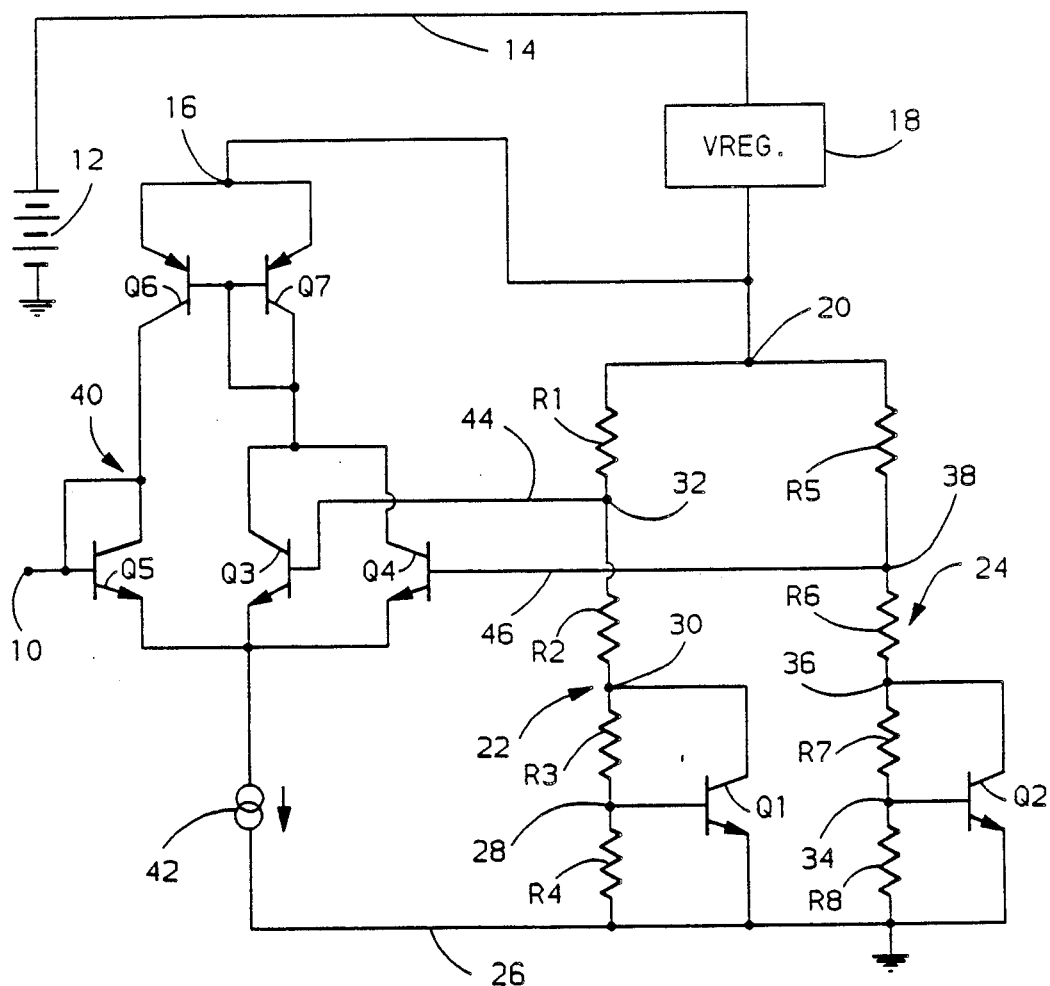
FIG. 1 is a schematic circuit diagram of a voltage reference circuit made in accordance with this invention.
Figure 2:
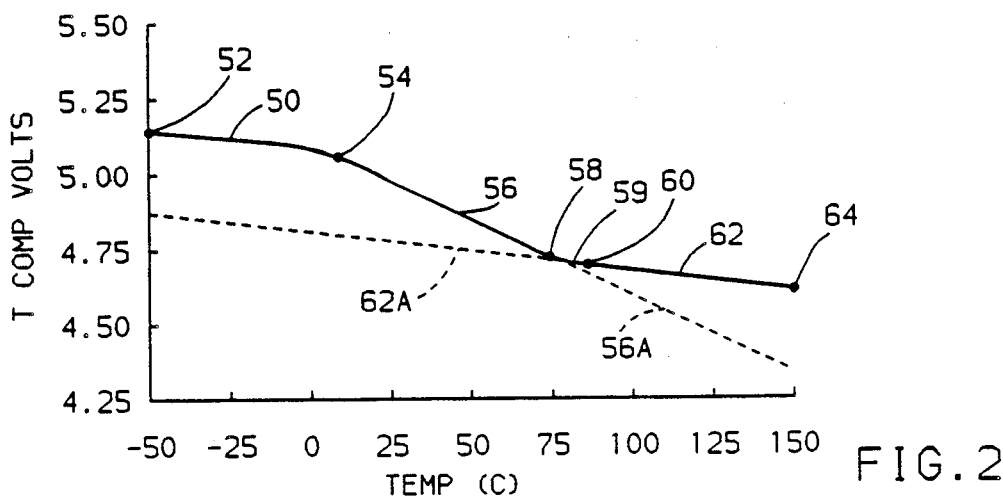
FIG. 2 is a curve of the output voltage of the circuit of FIG. 1 plotted against temperature.

Referring now to the drawings, FIG. 1 illustrates a temperature compensated voltage reference circuit made in accordance with this invention. This circuit develops an output voltage at terminal or junction 10 that varies with temperature. The voltage at junction 10 will be referred to hereinafter as TCOMP and the manner in which TCOMP varies with changes in temperature is illustrated in FIG. 2.

The intended use for the voltage reference circuit is to provide a reference voltage for a generator field-controlling voltage regulator where the generator provides charging current to a motor vehicle battery. The reference voltage is compared by the voltage regulator in a known manner with the battery voltage and the voltage regulator controls field current in such a manner that the voltage applied to the battery is set by and follows the reference voltage.

Referring again to FIG. 1, a direct voltage source 12 is shown which has been illustrated as a battery. The battery can be the battery on a motor vehicle and is a 12 volt battery that is charged by the output voltage of a diode-rectified alternating current generator (not illustrated). One side of battery 12 is connected to ground and its opposite side is connected to conductor 14. Conductor 14 is connected to the input of a voltage regulator circuit 18. The output of voltage regulator 18 is connected to junction 16 and junction 20. The output voltage of voltage regulator 18 will be referred to hereinafter as Vbg. Vbg is about 8 volts and it does not vary with changes in temperature. Voltage regulators for developing Vbg are well known to those skilled in the art.

The voltage reference circuit shown in FIG. 1 is comprised of two base-emitter multipliers generally designated respectively as 22 and 24. Base-emitter multiplier 22 is comprised of series-connected resistors R1, R2, R3 and R4 and an NPN transistor Q1. The resistors are connected in series between junction 20 and grounded conductor 26 and, accordingly, Vbg is applied between junction 20 and ground. The emitter of transistor Q1 is connected to conductor 26 and its base is connected to junction 28. The collector of Q1 is connected to junction 30. Connected between resistors R1 and R2 is a junction 32 which develops an output voltage that will be referred to hereinafter as Vth1.

The other base-emitter multiplier 24 is comprised of resistors R5, R6, R7 and R8 and an NPN transistor Q2. The resistors are connected in series between junction 20 and grounded conductor 26. The base of Q2 is connected to junction 34 and its emitter is connected to grounded conductor 26. The collector of Q2 is connected to junction 36. Connected between resistors R5 and R6 is a junction 38 which develops an output voltage that will be referred to hereinafter as Vth2.

The voltage reference circuit has a voltage selector circuit generally designated as 40. The purpose of this circuit is to cause the voltage at output terminal 10 to be the higher of Vth1 or Vth2. Thus, if Vth1 is higher than Vth2, only Vth1 will appear at terminal 10. If Vth2 is higher than Vth1, only Vth2 will appear at terminal 10.

Voltage selector circuit 40 is comprised of PNP transistors Q6 and Q7, NPN transistors Q5, Q3 and Q4 and a current source 42 that may be a resistor. Voltage Vth1 at junction 32 is applied to the base of Q3 via conductor 44. Voltage Vth2 at junction 38 is applied to the base of Q4 via conductor 46.

Q3, Q4 and Q5 are carefully matched transistors. The emitters of Q3 and Q4 are connected together as are the collectors of Q3 and Q4. If the base of Q3 has a higher voltage than the base of Q4, transistor Q3 is biased on and transistor Q4 is biased off. The voltage (Vth1−Vbe$_{Q3}$) is present at the emitter of Q5.

If the base of Q4 has a higher voltage than the base of Q3, then Q4 will be biased on and Q3 will be biased off. The voltage (Vth2−Vbe$_{Q4}$) is present at the emitter of Q5.

Q5 is connected as an emitter follower. Since Q3, Q4 and Q5 are carefully matched and since the collector current of Q5 will equal the collector current of Q3 or the collector current of Q4, it follows that if Q3 is biased on or conductive, Vth1 will appear at the base of Q5. If Q4 is biased on, Vth2 appears at the base of Q5. From what has been described, it will be appreciated that the higher voltage of Vth1 or Vth2 will appear at output terminal 10. This voltage, as previously mentioned, is TCOMP and it varies with temperature as shown in FIG. 2. When Vth1 is equal to Vth2, Q3 and Q4 share the current provided by Q7.

The operation of base-emitter multipliers 22 and 24 will now be described as well as how the curve, shown in FIG. 2, is developed.

The curve shown in FIG. 2 has a curved portion 50 between points 52 and 54, a substantially linear straight-line portion 56 between points 54 and 58, a slightly curved portion 59 between points 58 and 60 and another substantially straight line linear portion 62 between points 60 and 64. Also illustrated in FIG. 2 are dotted line portions 56A and 62A which do not appear at output terminal 10. These portions are linear extensions of portions 56 and 62 and depict voltages that are developed by the multipliers but which do not appear at output terminal 10 due to voltage selector circuit 40. Portions 56 and 56A correspond to Vth1, which is developed by multiplier 22 and portions 62 and 62A correspond to Vth2, which is developed by multiplier 24. The crossover point where Vth2 just starts to exceed Vth1 is at about 75 degrees C in FIG. 2. The slightly curved portion 59 is caused by the accuracy of the selector circuitry 40. The curved portion 50 is developed by multiplier 22 and it occurs when transistor Q1 begins to be biased to cut-off as is explained in more detail hereinafter.

Transistors Q1 and Q2 only operate in their linear and cut-off regions. The saturation mode is not allowed because of errors associated with operation in a saturation mode.

In general, the temperature dependence of each base-emitter multiplier is established by transistors Q1 and Q2 respectively. Thus, the base-emitter voltage of these transistors varies with changes in temperature. The base-emitter voltage has an inverse relationship to temperature change. Thus, as temperature increases, the base-emitter voltage decreases and vice-versa. Both multipliers 22 and 24 follow the same theory of operation. It is assumed that $I_{bQ1}=0$. When Q1 is turned on, the voltage $V_{R4}$ across R4 is equal to the voltage $Vbe_{Q1}$ across the base and emitter of Q1. Since the current $I_{R3}$, through resistor R3 is equal to the current $I_{R4}$ through resistor R4, the voltage dropped across R3, $V_{R3}=(R3/R4)*Vbe_{Q1}$. The voltage present at the collector of Q1, $V_{collQ1}$, is equal to $Vbe_{Q1}+(R3/R4)*Vbe_{Q1}$. The change of voltage with respect to temperature, or temperature coefficient, (TC) of $V_{R4}=(d/dt)Vbe_{Q1}$. The TC of $V_{collQ1}=(d/dt)Vbe_{Q1}+(R3/R4)*(d/dt)Vbe_{Q1}$. A similar analysis of the base current $Ib_{Q2}$ of Q2 also holds true.

The base-emitter multiplier 22 provides the temperature dependent voltage Vth1 and, accordingly, provides the curve between about $-50$ to about 70 degrees C as shown in FIG. 2. In order for Vth1 to mimic the curve of FIG. 2, Q1 must operate in the cutoff region during section 50 and the linear region during section 56 operation. When Q1 operates in the cutoff region;

$Vth1=Vbg(R2+R3+R4)/(R1+R2+R3+R4)$ and $(d/dt)Vth1=0$, because in this particular application $(d/dt)Vbg=0$. During linear operation:

$Vth1=Vbg*(R2/(R1+R2))+Vbe_{Q1}*(R1/(R1+R2))* ((R3+R4)/R4)$ and
$(d/dt)Vth1=(d/dt)Vbe_{Q1}*(R1/(R1+R2))* ((R3+R4)/R4)$.

The transition between these two regions, defined as $V_{th1cold}=Vth1(TC)$, occurs when the voltage required to drive the base of Q1 can no longer be maintained by the resistor divider comprised of R1, R2, R3 and R4. This point is defined by the ratio of $(R1+R2)$ to $(R3+R4)$.

The base-emitter multiplier 24 controls the hot characteristics of the TCOMP versus temperature curve shown in FIG. 2 from about 70 to 150 degrees C (curve portion 60). This circuit does not contribute at cold temperatures.

In order for Vth2 to mimic section 62 of the curve in FIG. 2, Q2 must operate in the linear region. During this linear operation:

$Vth2=Vbg*(R6/(R5+R6))+Vbe_{Q2}*(R5/(R5+R6))* ((R7+R8)/R8)$ and
$(d/dt)Vth2=(d/dt)Vbe_{Q2}*(R5/(R5+R6))* ((R7+R8)/R8)$.

The intersection of Vth1 and Vth2 defines the second break point of the curve in FIG. 2.

It can be appreciated from FIG. 2, that the portions 62 and 62A of the curve shown in FIG. 2 have a different slope than portions 56 and 56A. Portions 62 and 62A (Vth2) are produced by multiplier 24 and portions 56 and 56A by multiplier 22. The two multipliers are arranged to produce a different slope output voltages and this is accomplished by the proper ratioing of the resistors of the respective multipliers. In this regard, the magnitude of $(R3+R4)/R4$ which determines the multiplier magnitude of multiplier 22 is larger than the magnitude $(R7+R8)/R8$, which determines the multiplier magnitude of multiplier 24. Since multiplier 22 has a greater multiplier magnitude than multiplier 24, the slope of curve portions 56 and 56A (Vth1) is larger than the slope of curve portions 62 and 62A (Vth2). Putting it another way, for a given temperature change, the multiplier 22 produces a greater change in output voltage than the multiplier 24.

It can be appreciated that the circuit of FIG. 1 produces three slopes that make up the curve of FIG. 2. Slope #1 from about points 52 to 54 and is produced by operation of transistor Q1 in the cut-off mode. Slope #2 from about points 54 to 58 is produced by transistor Q1 operating in the linear mode. Slope #3 from about points 60 to 64 is produced by transistor Q2 operating in the linear mode. As previously mentioned, curve portion 59 corresponds to the mode of operation where voltage selector 40 is in a transition stage where it will select the higher of Vth1 or Vth2.

It will be appreciated that the circuit of FIG. 1 could be modified to provide more than three slopes. This can be accomplished by using more than two base-emitter multipliers.

The TCOMP-temperature curve of FIG. 2 is designed to provide the proper charging voltage to a motor vehicle battery over a temperature range. Thus, when TCOMP is used as the reference voltage for a generator voltage regulator, the voltage applied to the battery will follow the TCOMP curve shown in FIG. 2. TCOMP is compared with a divided-down representation of battery voltage in the generator voltage regulator in a manner well known to those skilled in the art.

The embodiments of the invention in which an exclusive property or privilege is claimed are defined as follows:

1. A reference voltage developing circuit for developing a temperature dependent multiple slope reference voltage comprising, a first circuit comprising the base and emitter of a first transistor for developing a voltage the magnitude of which varies with changes in temperature and which responds to changes in the base-emitter voltage of said first transistor with changes in temperature, said first circuit including means operative to provide a first voltage that has a first slope, a second circuit comprising the base and emitter of a second transistor for developing a voltage the magnitude of which varies with changes in temperature and which responds to changes in the base-emitter voltage of said second transistor with changes in temperature, said second circuit including means operative to provide a second voltage that has a second slope that is different from said first slope, and voltage selector means coupled to said first and second circuits for providing an output voltage which corresponds to only one of said first and second voltages.

2. The reference voltage developing circuit according to claim 1 where said voltage selector means provides an output voltage that corresponds to the higher of said first and second voltages.

3. The reference voltage developing circuit according to claim 1 wherein said first and second circuits each include multiplying means for multiplying the base-emitter voltage of a respective transistor and further wherein the multiplier magnitude of the respective multiplying means is not the same.

4. A reference voltage developing circuit for developing a temperature dependent multiple-slope reference voltage comprising, a plurality of base-emitter multiplier circuits, each multiplier circuit comprising a transistor, the base-emitter voltage of each said transistor varying with changes in temperature, each said multiplier circuit developing an output voltage that is a function of temperature, said multiplier circuits being so constructed and arranged as to develop respective temperature dependent output voltages that have different slopes, and a voltage selector circuit connected to said multipliers to receive the respective output voltage of said multipliers, said selector circuit having an output and including means for selecting and applying the output voltage of only one of said multipliers to said output of said selector circuit.

5. The voltage reference circuit according to claim 4 where the multiplier magnitude of the multipliers is not the same.

6. The reference voltage developing circuit according to claim 4 where said voltage selector circuit selects and applies the higher of said output voltages to said output of said selector circuit.

7. The reference voltage developing circuit according to claim 4 where said output of said selector circuit is connected to the base of a transistor that is connected as an emitter-follower.

* * * * *